United States Patent
Durrant et al.

(10) Patent No.: US 7,165,728 B2
(45) Date of Patent: Jan. 23, 2007

(54) RADIO FREQUENCY IDENTIFICATION FOR TRANSFER OF COMPONENT INFORMATION IN FIBER OPTIC TESTING

(75) Inventors: Richard C. E. Durrant, Suffolk (GB); Mark Krowiak, Oak Park, IL (US)

(73) Assignee: Stratos International, Inc., Chicago, IL (US)

( * ) Notice: Subject to any disclaimer, the term of this patent is extended or adjusted under 35 U.S.C. 154(b) by 288 days.

(21) Appl. No.: 11/012,504

(22) Filed: Dec. 15, 2004

(65) Prior Publication Data

US 2005/0220426 A1    Oct. 6, 2005

Related U.S. Application Data

(63) Continuation-in-part of application No. 10/816,749, filed on Apr. 2, 2004.

(51) Int. Cl.
  *G06K 19/06* (2006.01)
  *G01N 21/00* (2006.01)
  *G02B 6/36* (2006.01)

(52) U.S. Cl. .......................... 235/492; 385/53; 385/88; 356/73.1

(58) Field of Classification Search ............... 235/492; 385/53, 60, 88; 382/100; 340/687; 356/73.1
See application file for complete search history.

(56) References Cited

U.S. PATENT DOCUMENTS

| | | | | |
|---|---|---|---|---|
| 5,206,626 A | | 4/1993 | Minasy et al. | 340/572 |
| 5,233,674 A | | 8/1993 | Vladic | 385/56 |
| 5,448,110 A | | 9/1995 | Tuttle et al. | 257/723 |
| 5,481,634 A | | 1/1996 | Anderson et al. | 385/76 |
| 5,699,440 A | * | 12/1997 | Carmeli | 382/100 |
| 6,118,379 A | | 9/2000 | Kodukula et al. | 340/572.8 |
| 6,147,655 A | | 11/2000 | Roesner | 343/741 |
| 6,350,063 B1 | | 2/2002 | Gilliland et al. | 385/88 |
| 6,424,263 B1 | | 7/2002 | Lee et al. | 340/572.7 |
| 6,429,831 B2 | | 8/2002 | Babb | 343/895 |
| 6,445,297 B1 | | 9/2002 | Nicholson | 340/572.7 |
| 6,451,154 B1 | | 9/2002 | Grabau et al. | 156/300 |
| 6,454,464 B1 | * | 9/2002 | Nolan | 385/60 |
| 6,677,917 B2 | | 1/2004 | Van Heerden et al. | 343/897 |
| 6,784,802 B1 | | 8/2004 | Stanescu | 340/687 |
| 6,808,116 B1 | | 10/2004 | Eslambolchi et al. | 235/492 |
| 2004/0008114 A1 | | 1/2004 | Sawyer | 340/572.1 |
| 2004/0008120 A1 | | 1/2004 | Duncan et al. | 340/685 |
| 2004/0008123 A1 | | 1/2004 | Carrender et al. | 340/825.49 |
| 2004/0010449 A1 | | 1/2004 | Berardi et al. | 705/16 |
| 2004/0105325 A1 | | 6/2004 | Sago et al. | 365/200 |

(Continued)

*Primary Examiner*—Daniel A. Hess
(74) *Attorney, Agent, or Firm*—Karl D. Kovach

(57) ABSTRACT

The device includes a connector, a transponder, an optical test unit, an antenna, and a transceiver. The transponder is attached to the connector. The antenna is attached to the optical test unit. The transceiver is electrically connected to the antenna. When the connector is attached to the optical test unit and the optical test unit performs diagnostic testing on the connector and its associated optical fiber, the results or data of the diagnostic testing are stored in the optical test unit for later downloading from the optical test unit to the transponder. The test data can include attenuation loss, insertion loss, and back reflection test data. Once the connector is connected to a host device, the data associated with the specific connector can uploaded from the transponder to the host device.

5 Claims, 10 Drawing Sheets

U.S. PATENT DOCUMENTS

2004/0117515 A1  6/2004  Sago et al. .................... 710/1
2004/0120657 A1  6/2004  Sago et al. .................... 385/88
2004/0156601 A1  8/2004  Koyasu et al. .............. 385/100

* cited by examiner

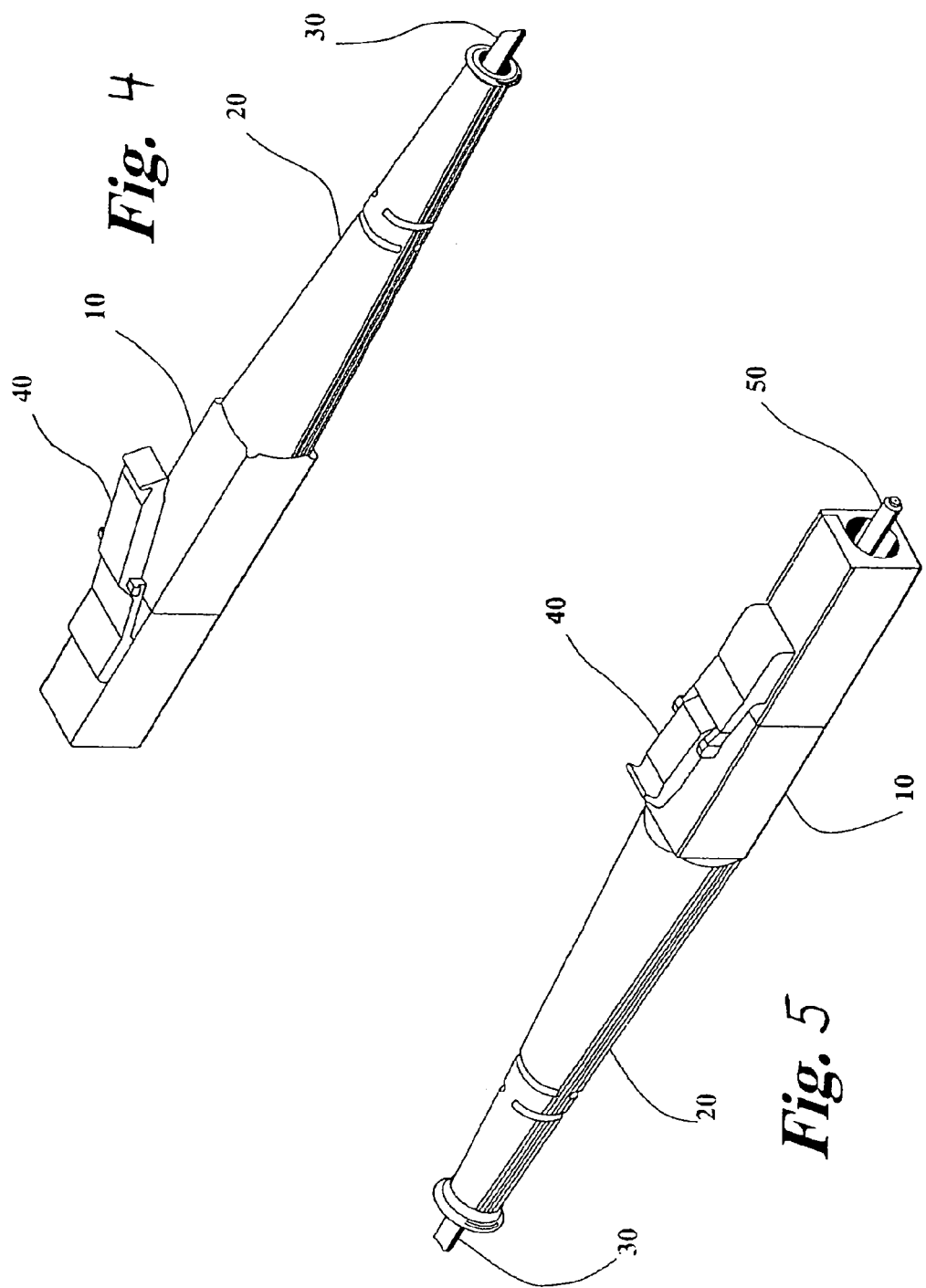

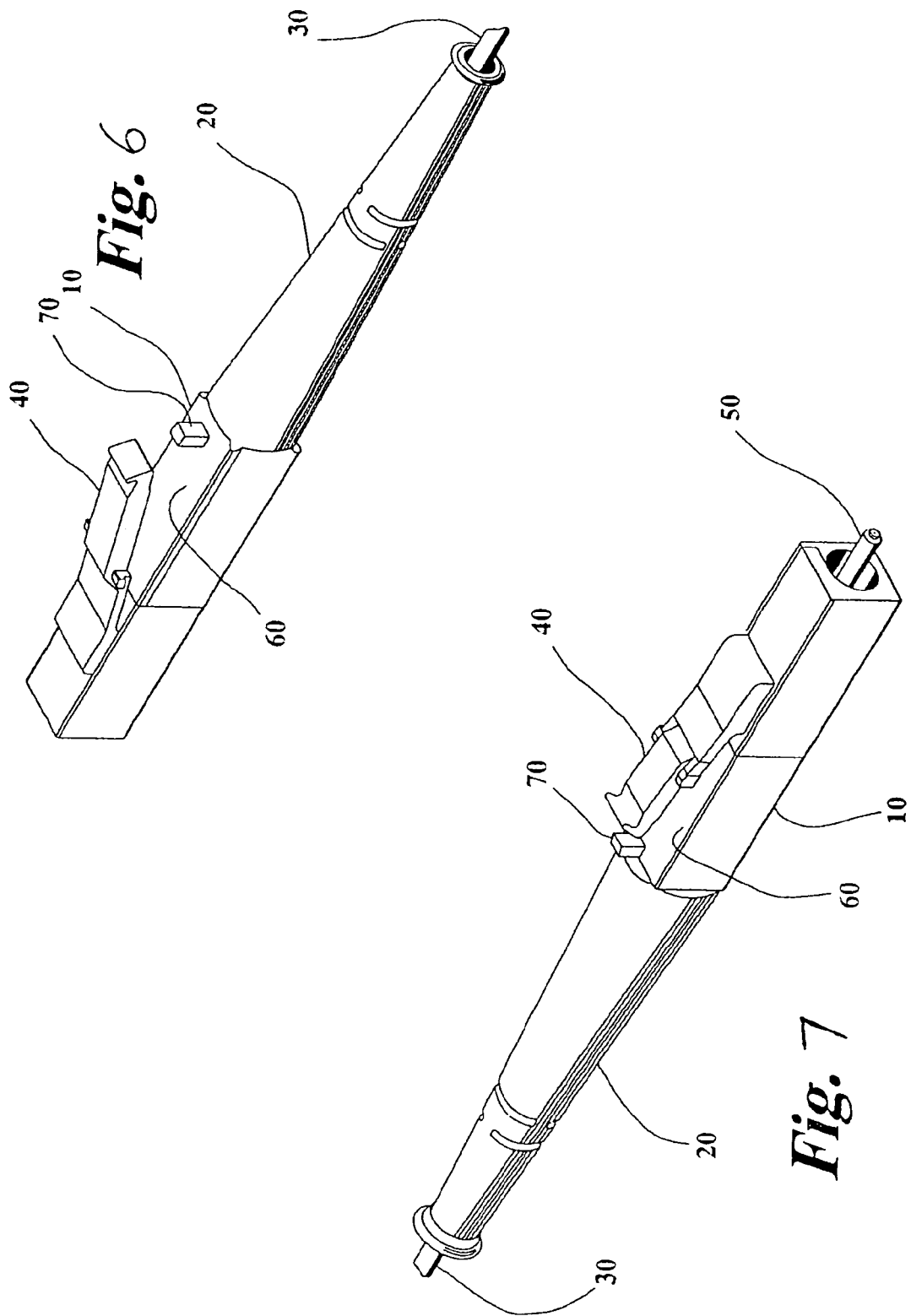

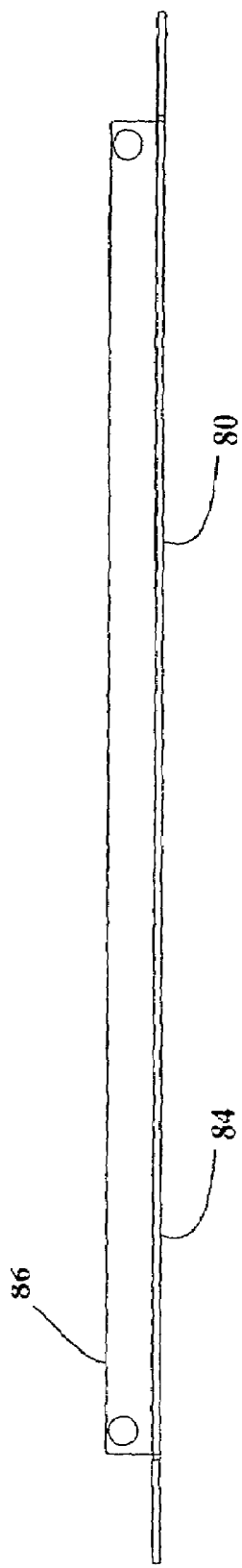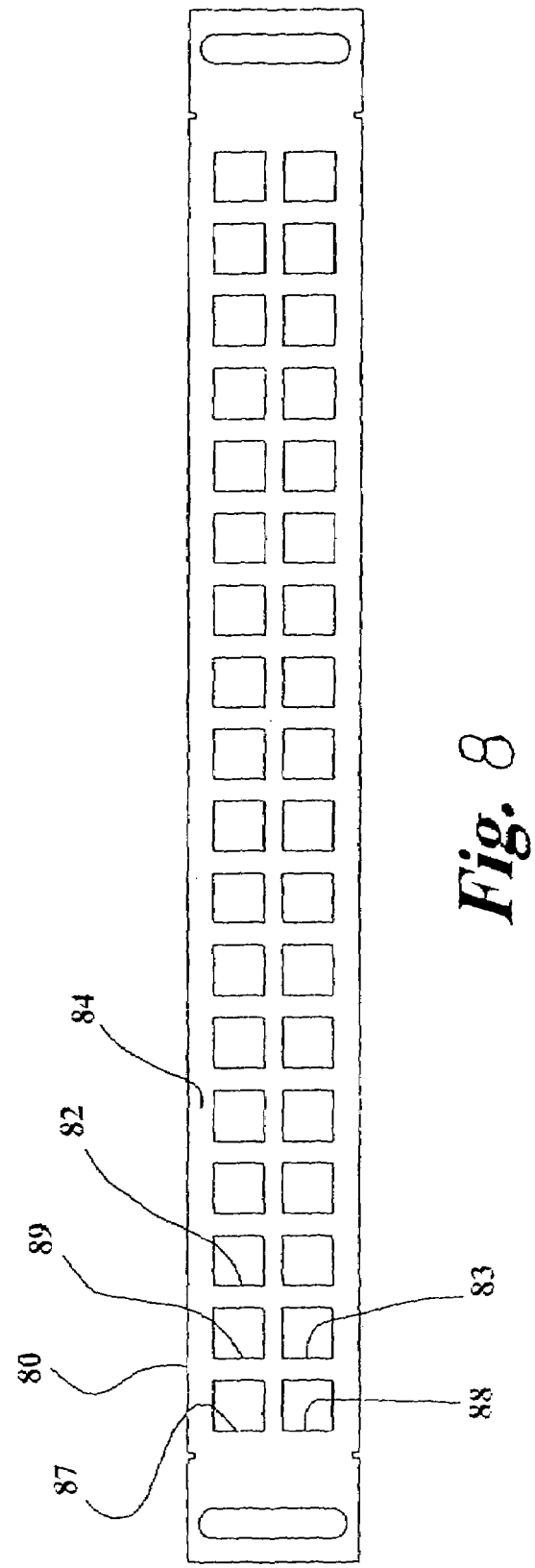

RADIO FREQUENCY IDENTIFICATION FOR TRANSFER OF COMPONENT INFORMATION IN FIBER OPTIC TESTING

This application is a continuation-in-part of U.S. Ser. No. 10/816,749, filed Apr. 2, 2004. The aforementioned parent application is hereby incorporated herein by reference.

BACKGROUND OF THE INVENTION

1. Field of the Invention

The present invention pertains to radio frequency identification devices. The invention more particularly concerns the application of radio frequency identification technology for the transfer of component information in fiber optic testing.

2. Discussion of the Background

Radio frequency identification devices (RFID) are known in the art. Typically, radio frequency identification systems incorporate an antenna or coil, a transceiver (with decoder), and a transponder (RF tag). Often times the antenna and the transceiver are packaged together so as to form a reader or interrogator. The transponder includes a transponder antenna and an integrated circuit chip attached to the transponder antenna. The antenna or coil emits a radio wave which induces an electrical current in the antenna of the transponder. The electrical current then activates the integrated circuit chip of the transponder. The integrated circuit chip can then transmit information through the antenna of the transponder via radio waves back to the antenna or coil. Information can be stored on the integrated circuit as either read only memory or read/write memory.

Radio frequency identification devices can be either active or passive. An active system includes a transponder which contains its own power source. In contrast, in a passive system the transponder obtains the energy from the radio waves emanating from the antenna or coil so as to enable the transponder to operate and transmit information. A transponder operating in accordance with the active system is able to transmit information to the antenna or coil over a greater distance than is a transponder operating in accordance with the passive system. However, the transponder operating in accordance with the active system is larger than the transponder operating in accordance with the passive system. Furthermore, typically, transponders operating in accordance with the passive system contain integrated circuit chips that have read only memory. Examples of radio frequency identification components are presented in U.S. Pat. Nos. 5,206,626; 5,448,110; 6,118,379; 6,147,655; 6,424,263; 6,429,831; 6,445,297; 6,451,154; 6,677,917; and 6,784,802. U.S. Pat. Nos. 5,206,626; 5,448,110; 6,118,379; 6,147,655; 6,424,263; 6,429,831; 6,445,297; 6,451,154; 6,677,917; and 6,784,802 are hereby incorporated herein by reference.

Connectors and panels or patch panels are also known in the art. Known connectors include fiber optic connectors and electrically conductive connectors. An electrically conductive connector can be attached to electrically conductive cable such as copper based cable, or the electrical conductive connector can be integrated into a device such as an optoelectronic device. U.S. Pat. No. 6,350,063 discloses electrical connectors and cables, and an optoelectronic device. U.S. Pat. No. 6,350,063 is hereby incorporated herein by reference. FIG. 1 is a perspective view of an electrical connector 120 attached to an electrically conductive cable 122. Also shown is a complementary receptacle 130 into which the electrical connector 120 mates. FIG. 2 is a perspective view of another version of an electrical connector 140. The connector 140 is shown from a first perspective and a second perspective. FIG. 2 also discloses another version of a complementary receptacle 150. FIG. 3 is a perspective view of an optoelectronic device 160 which includes a fiber optic connector 170 and an electrical connector 180. The background material provided below concentrates on fiber optic connectors.

The front panel of a host device has many receptacles. Each receptacle accepts at least an individual fiber optic cable. The other end of the fiber optic cable connects to another device. The fiber optic cable can have a length of a few meters or of a few kilometers. A host device can accommodate a few hundred fiber optic cables. U.S. Pat. Nos. 5,233,674, and 5,481,634 disclose a fiber optic cable having a fiber optic connector. U.S. Pat. Nos. 5,233,674, and 5,481,634 are hereby incorporated herein by reference. FIG. 4 is a perspective view of a fiber optic cable 30 having a fiber optic connector 10. Attached to the fiber optic connector 10 is a strain relief boot 20. Formed as part of the optic connector is a release lever 40. FIG. 5 is a perspective view of the fiber optic cable 30 of FIG. 4 taken from another angle where a ferrule 50 is exposed. The fiber optic connector 10 conforms to the LC style of fiber optic connectors.

As discussed above, a optical fiber can connect two devices together where the two devices are separated by a distance ranging from a few meters to a few kilometers. To transmit and receive data over long distances, the optical fiber, and the fiber optic connector terminating the optical fiber, must have acceptable power loss levels. Loss of power of the optical signal can occur due to attenuation and insertion loss. Attenuation of the optical signal can occur due to scatter, back reflection, diffusion, and etc. The attenuation losses are typically due to the less than perfect optical transparency material used to make the optical fiber and due to the angle and surface preparation of the terminal ends of the optical fiber. An insertion loss is the power loss of the optical data signal at the interface between one end of the fiber optic cable and the device to which it is connected. Thus, knowledge of the fiber optic cables functional parameters, including attenuation, insertion loss, and back reflection are important to the proper operation of an optical fiber based communication system.

SUMMARY OF THE INVENTION

It is an object of the invention to provide a device which facilitates the transmission of data from an optical test unit to a connector via radio frequency identification components, where the data concerns performance characteristics of the connector and associated cable.

It is another object of the invention to provide a device which facilitates the transmission of data from a connector to a host device via radio frequency identification components.

In one form of the invention the device includes a connector, a transponder, an optical test unit, an antenna, and a transceiver. The transponder is attached to the connector. The antenna is attached to the optical test unit. The transceiver is electrically connected to the antenna. In operation, when the connector is connected to the optical test unit, the transponder is then close enough to the antenna, the transceiver is able to activate the transponder thus enabling the transponder to accept data concerning the performance characteristics previously measured by the optical test unit. The data can include, for example, attenuation, insertion loss, and back reflection of the connector and associated optical fiber.

In another form of the invention, the device includes a connector, a transponder, a host device, an antenna, and a transceiver. The transponder is attached to the connector. The antenna is attached to the host device. The transceiver is electrically connected to the antenna so as to form a reader or interrogator. In operation, when the connector is connected to the host device, the antenna is then close enough to the antenna, the transceiver is bale to activate the transponder thus enabling the transponder to read the information, or test data, deposited with the transponder. The host device will then know what the characteristics are of the connector and associated optical fiber.

Thus, the invention achieves the objectives set forth above. The invention provides a device which is able to impart specific performance data pertaining to a specific optical fiber and connector to a transponder attached to the connector for later downloading to a host device to which the subject connector is attached.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a perspective view of a known fiber optic cable and connector assembly;

FIG. 5 is a perspective view of the fiber optic cable and connector assembly of FIG. 4 taken from another angle;

FIG. 6 is a perspective view of the combination of the fiber optic cable and the transponder;

FIG. 7 is a perspective view of the combination of the fiber optic cable and the transponder of FIG. 6 taken from another angle;

FIG. 8 is a front view of a panel of a patch panel or of a host device;

FIG. 9 is a side view of the panel of FIG. 8;

DETAILED DESCRIPTION OF THE PRESENTLY PREFERRED EMBODIMENT

Figure 15:
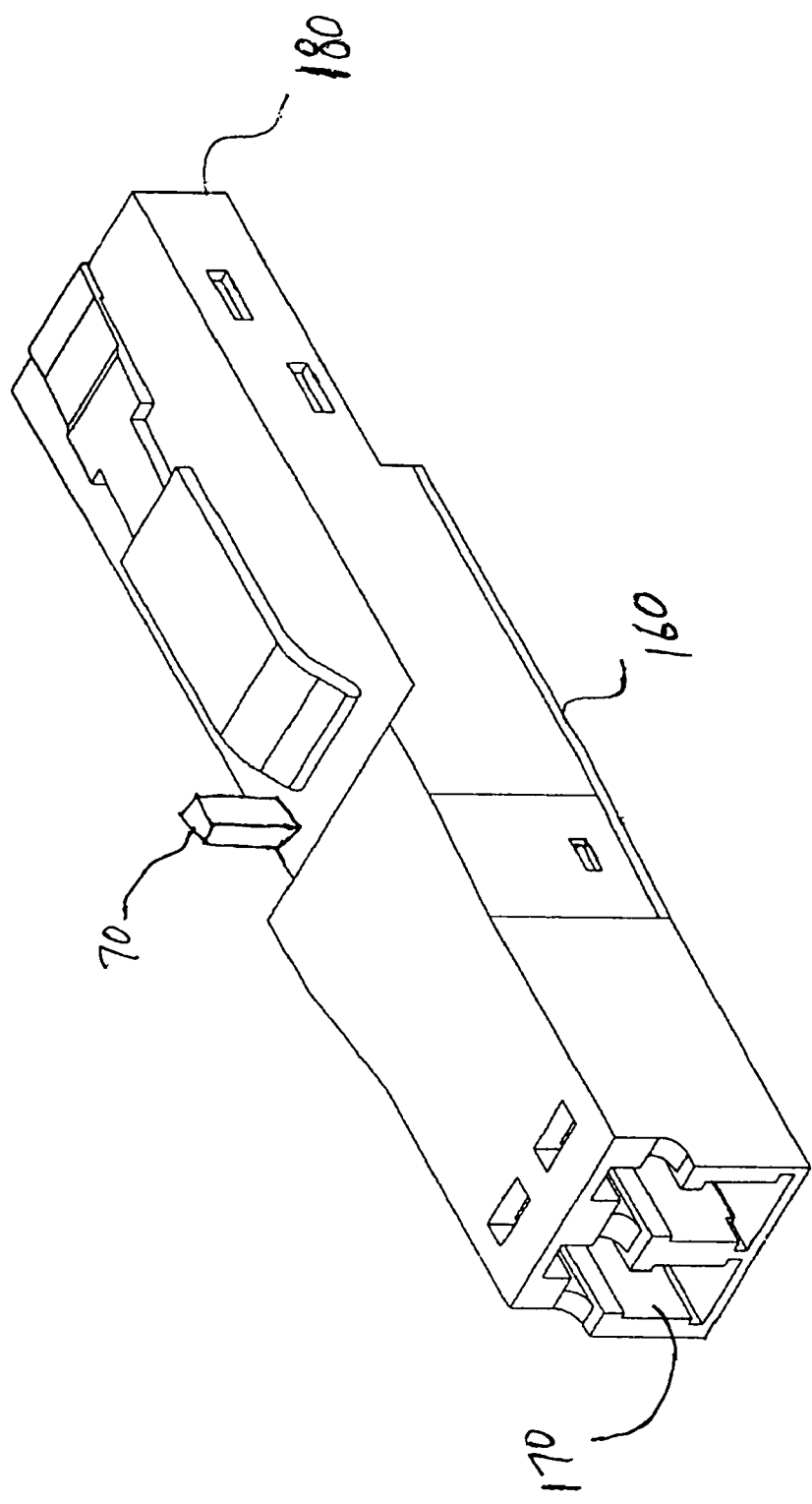
FIG. 15 is a perspective view of the combination of the optoelectronic device of FIG. 3 and the transponder.
Figure 16:
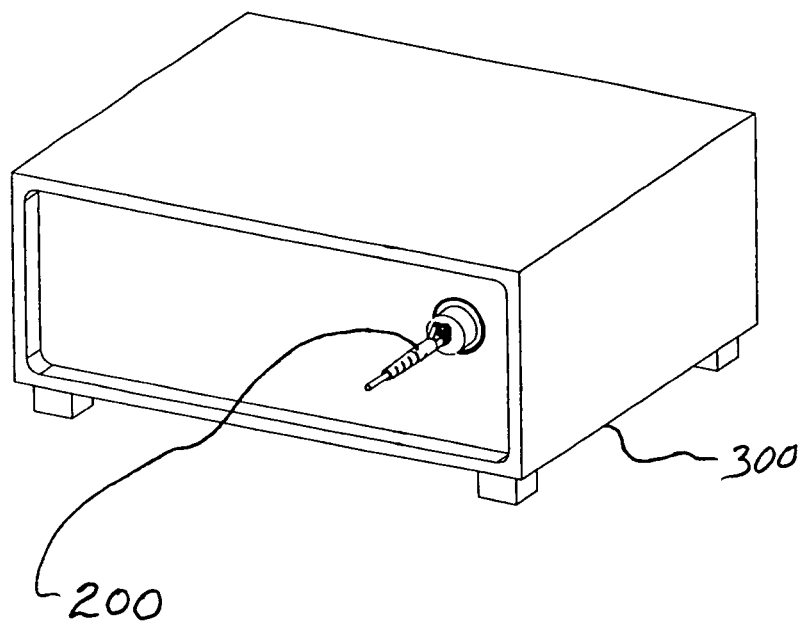
FIG. 16 is a perspective view of a connector attached to a host device.
Figure 17:
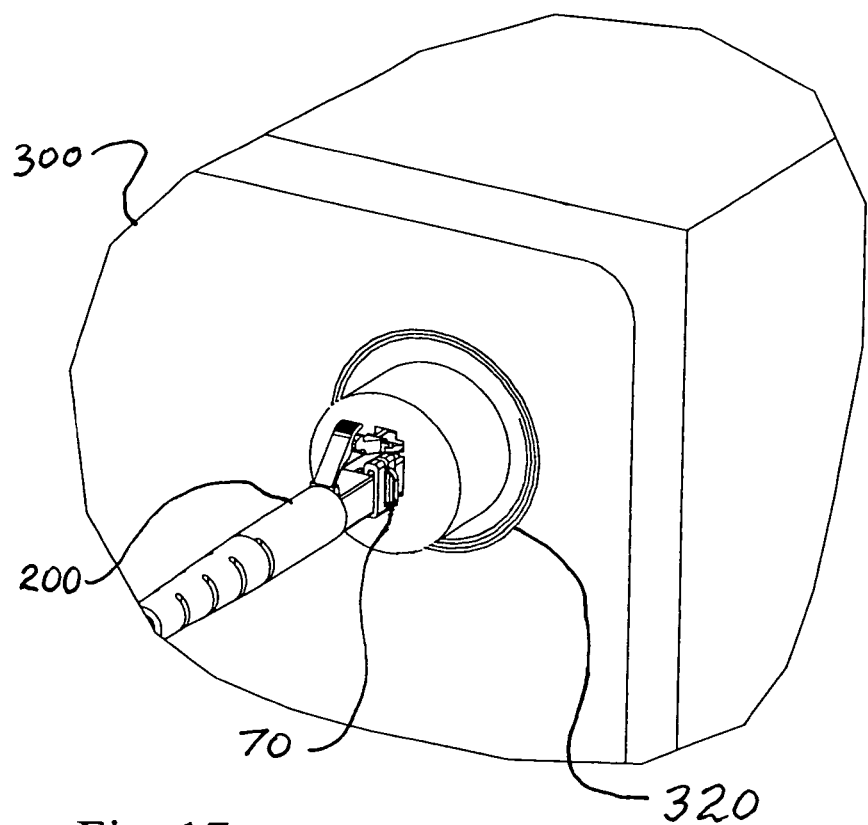
FIG. 17 is an enlarged view of the area around the connection between the connector and the host device.

Referring now to the drawings, wherein like reference numerals designate identical or corresponding parts throughout the several views, and more particularly to FIGS. 16, and 17 thereof, embodiments of the present invention are displayed therein. However, FIGS. 6–15 are first discussed so as to present features of the present invention that are not shown in FIGS. 16, and 17 due to reasons of clarity.

FIG. 6 is a perspective view of a fiber optic cable 30 having a fiber optic connector 10. The fiber optic connector 10 includes a release lever 40. Attached to the fiber optic connector 10 is a strain relief boot 20. Also attached to, or mounted on or in, the fiber optic connector 10 is a transponder 70. The transponder 70 can be affixed to the fiber optic connector 10 with an adhesive material or a clip (not shown). The clip physically squeezes or clamps the transponder 70 to the fiber optic connector 10. Alternatively, the transponder 70 can be insert molded into the body of the fiber optic connector 10. Furthermore, the transponder 70 can be attached to fiber optic connectors which are already in-service.

FIG. 7 is a perspective view of a fiber optic cable 30 of FIG. 6 taken from another angle. The view of the fiber optic cable 30 of FIG. 7 exposes the ferrule 50. The fiber optic connector 10 generally conforms to the LC standard, however, the fiber optic connector can also be constructed to conform to any other standard such as MTP, MPX, HBMT, SC, ST, FC, MU, and RF and micro-wave connection types. The ferrule 50 is a single fiber ferrule, however multi-fiber ferrules and connectors can also be employed. Additionally, the fiber optic connector can be of its own unique design. Furthermore, the optical fiber terminated at the ferrule 50 can be any one of a single mode fiber, a multimode fiber, a polarization maintaining fiber, or any other type of optical fiber.

FIG. 8 is a front view of a panel 80. The panel 80 can belong to a patch panel device, a host device, or some other similar structure. The panel 80 has a front surface or face 84. The panel 80 includes many apertures 82, 83, 87, 88, and 89. FIG. 9 is a side view of the panel 80 which exposes the rear edge 86. By way of example, the aperture 82 allows the fiber optic connector 10 to pass beyond the front surface 84 of the panel 80 so as to gain access to the host device. The release latch 40 of the fiber optical connector 10 is used to secure the fiber optic connector 10 to the host device. Upon depressing the release lever 40 the fiber optic connector 10 can be removed from the hot device.

Figure 1:
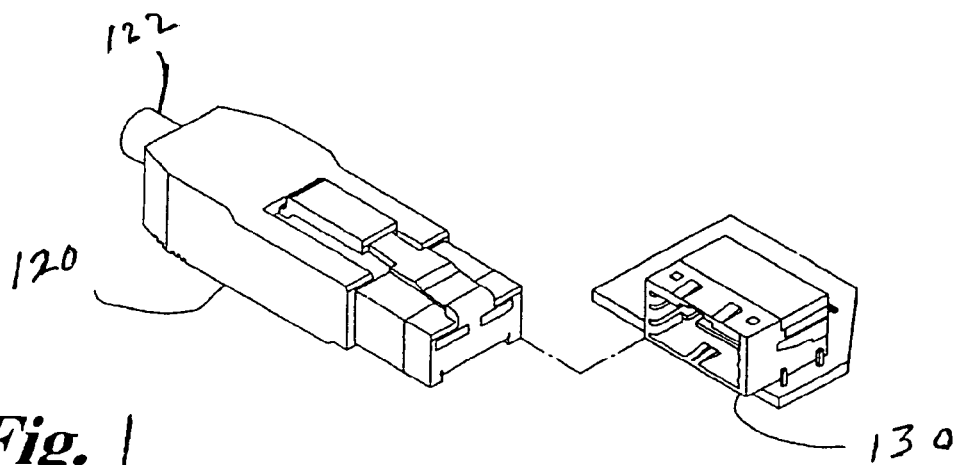
FIG. 1 is a perspective view of a copper based electrical connector and a complementary receptacle, the electrical connector is attached to a copper based electrical cable.
Figure 2:
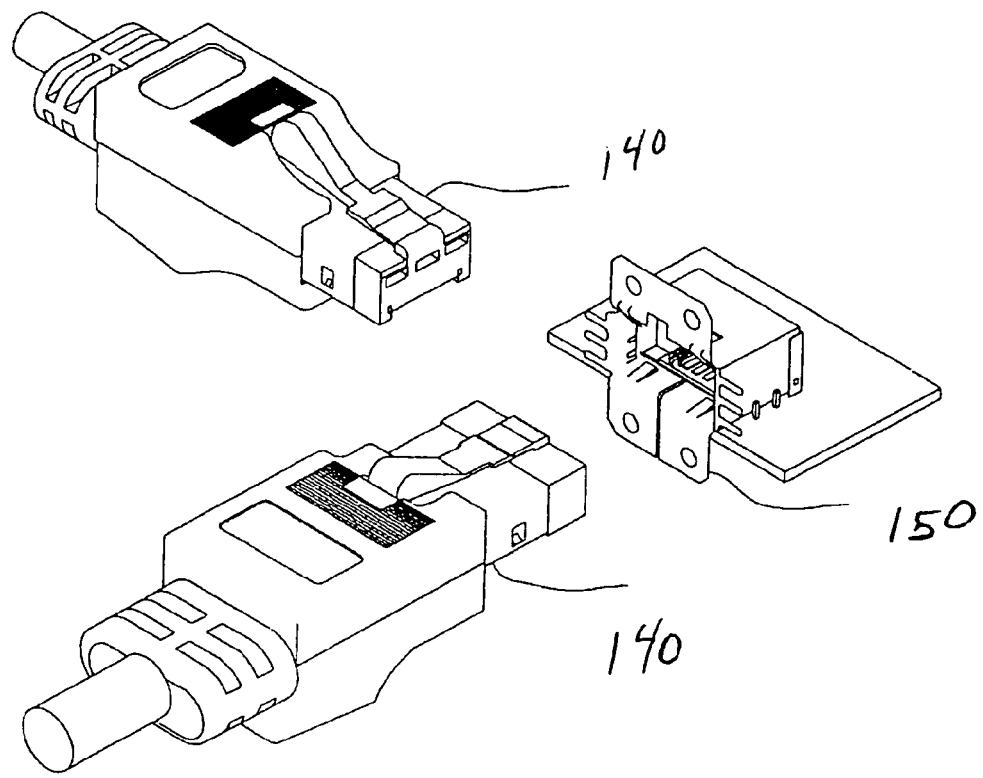
FIG. 2 is a perspective view of another version of the electrical connector and complementary receptacle of FIG. 1.
Figure 3:
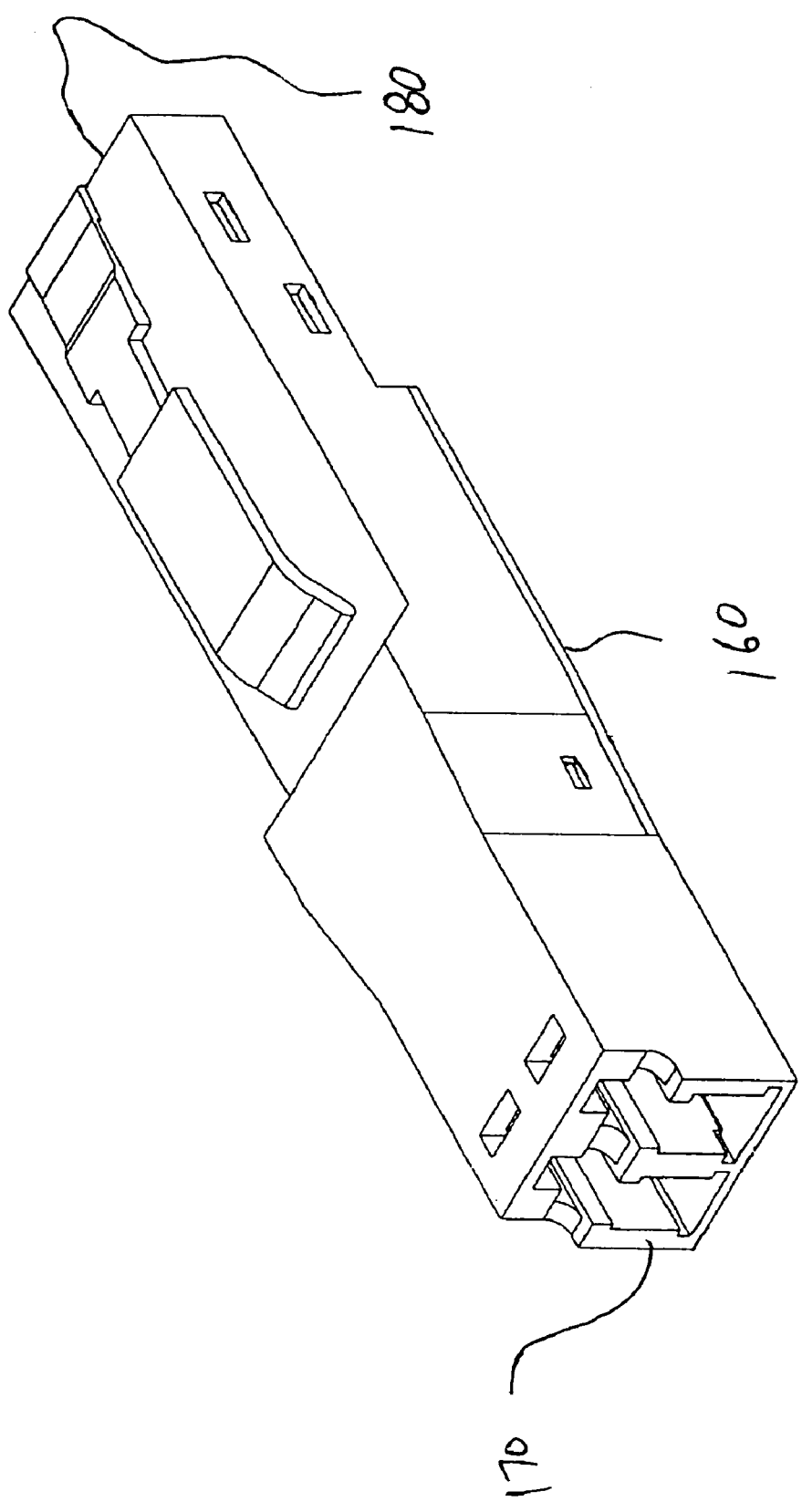
FIG. 3 is a perspective view of an optoelectronic transceiver which has an optical connector end and an electrical connector end.
Figure 10:
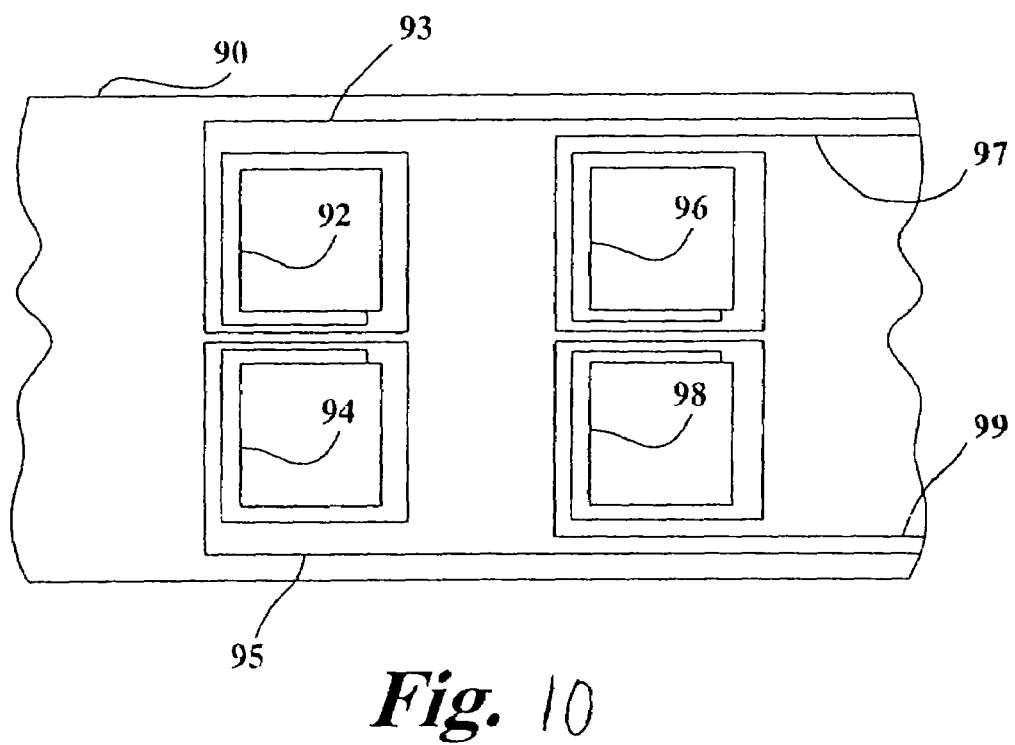
FIG. 10 is a partial front view of a substrate having apertures and coils or antennas.

FIG. 10 is a partial front view of a substrate 90 having apertures 92, 94, 96, 98, and coils or antennas 93, 95, 97, 99. Each coil or antenna 93, 95, 97, 99 surrounds a respective aperture 92, 94, 96, 98. The coils or antennas 93, 95, 97, 99 are made of a suitable electrically conductive material such as copper. The coils or antennas 93, 95, 97, 99 are adhered or attached to a substrate or are sandwiched between two substrates. Typically, the coils or antennas 93, 95, 97, 99 are attached to the substrate with an adhesive material. The substrates are typically made of non-conductive or insulative materials such as mylar or other suitable polymer materials.

Any number of apertures may be used. However, in this application the number of apertures 92, 94, 96, 98 of the substrate 90 should be of approximately the same size and have the same orientation and spacing as the apertures 87, 88, 89, 83 of the panel 80. U.S. Pat. No. 4,972,050 discloses a method of constructing a substrate, where the substrate includes conductive paths such as coils or antennas. The coils or antennas 93, 95, 97, 99 are shown as having a generally square shape, however, any suitable shape may be used. U.S. Pat. No. 4,972,050 is hereby incorporated herein by reference. The antennas can be affixed originally to the panel 80, or in an alternative, as explained above, the antennas are part of the substrate 90 which can be mounted to a panel 80 of a host device which is already in-service.

Figure 11:
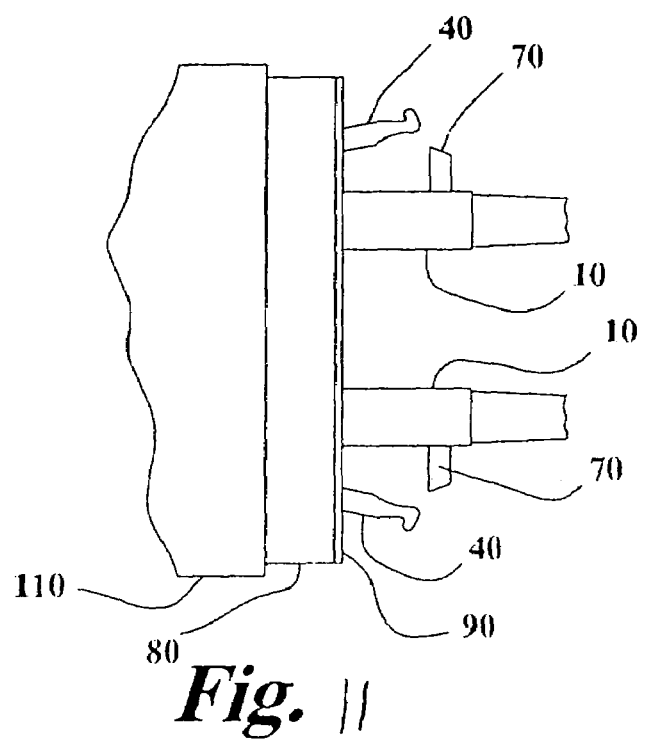
FIG. 11 is a partial side view of the combination of the fiber optic cable having the transponder of FIGS. 6 and 7 connected to the panel of FIGS. 8 and 9 of a host device where the panel includes the substrate of FIG. 10.

FIG. 11 is a partial side view of the substrate 90 being located adjacent to the front surface 84 of the panel 80 of the host device 110 where the fiber optic connector 10 is plugged into the host device 110. During assembly, the substrate 90 can be placed adjacent to the front surface 84 of the panel 80 by an adhesive material or clips or other methods of attachment well known in the art.

In practice, for example, a fiber optic connector 10 is inserted into and through aperture 92 of the substrate 90 and through aperture 87 of the panel 80 so as to engage the fiber optic connector 10 with the host device 110. Once installed, the antenna or coil 93 encircles a portion of the fiber optic connector 10 in the plane of the substrate 90. The transponder 70 is close enough to the antenna or coil 93 so that the radio waves, or electromagnetic power 104, emanating from antenna or coil 93 induce an electrical current in the transponder antenna 72 (see FIG. 12) of the transponder 70. The energy and frequency of the electrical signal running though the antenna or coil 93 is provided by a transceiver 102 (see FIG. 12) which is electrically connected to antennas or coils 93, 95, 97, and 99. The combination of an antenna and a transceiver is known as a reader or interrogator.

Figure 12:
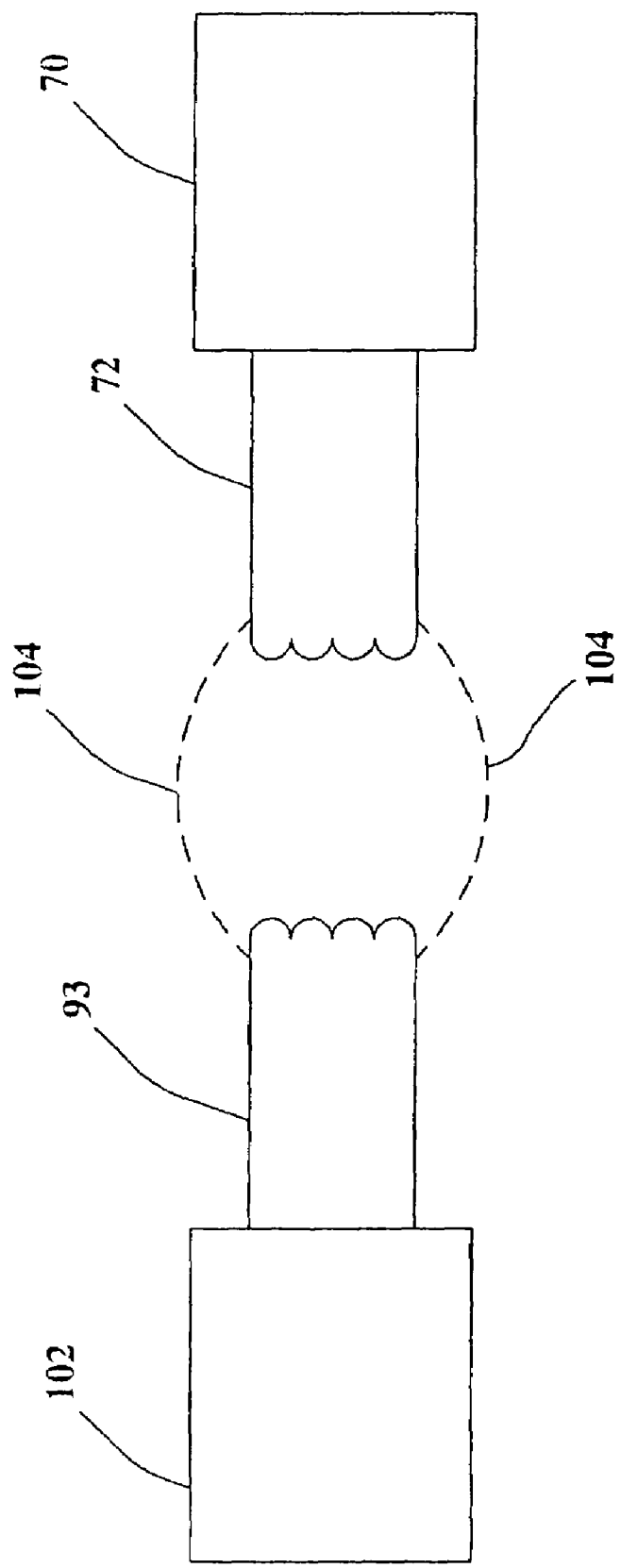
FIG. 12 is an electrical schematic of the electromagnetic interaction between the transponder and the reader or interrogator.

FIG. 12 is an electrical schematic of the electromagnetic interaction between the transponder 70 and the reader or interrogator (93, 102). Once the transponder 70 is energized by the power from the transceiver 102, the transponder sends information, which was previously stored on its integrated circuit chip, to the transceiver 102 via radio waves. The radio waves leave the transponder antenna 72 and are received by the antenna or coil 92. The induced electrical signal is then carried to the transceiver 102 for storage or manipulation of the data supplied by the transponder 70.

Examples of information which can be stored in the transponder 70 include the following information: the length of the fiber optic cable to which the transponder is attached; the date of purchase of the fiber optic cable to which the transponder is attached; the type or style of fiber optic connector to which the transponder is attached; the type of warranty associated with the fiber optic cable to which the transponder is attached; date of manufacture; the type, style, or grade of optic fiber housed within the fiber optic cable to which the transponder; and/or a unique identification number or serialization number or code which uniquely identifies a specific fiber optic cable.

Thus, if the fiber optic cable goes dark because the optical fiber housed within the fiber optic cable is broken, then the host device 110, through the transceiver 102, can pinpoint the location of the malfunctioning fiber optic cable. The malfunctioning fiber optic cable can then be repaired or replaced. Additionally, the device provides a system operator with the ability to monitor the number and location of the fiber optic connectors attached to the host device.

Figure 13:
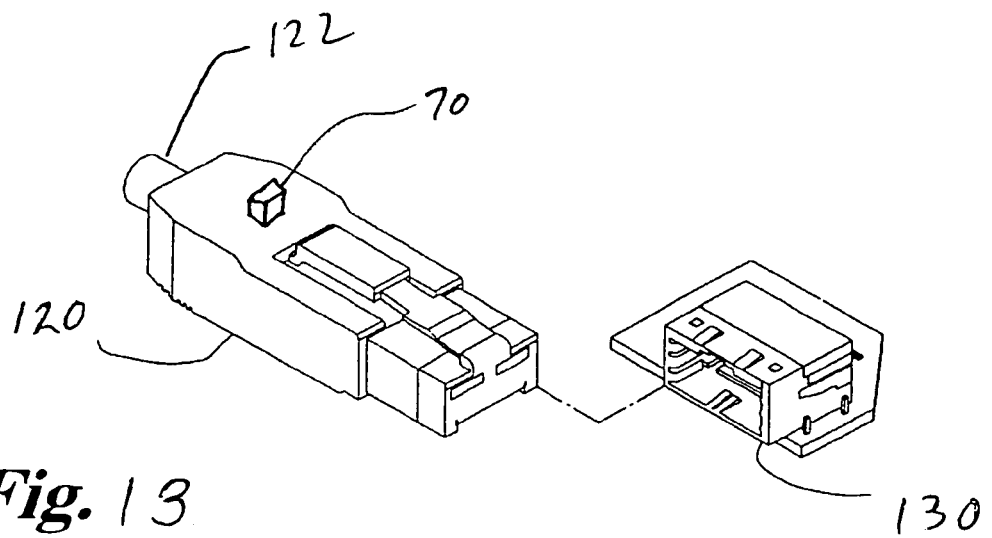
FIG. 13 is a perspective view of the combination of the electrically conductive, copper based cable of FIG. 1 and the transponder.

Instead of attaching the transponder to a fiber optic connector, it may be attached to an electrical connector. FIG. 13 is a perspective view of an electrical connector 120 to which is attached a transponder 70. The electrical connector 120 mates with a receptacle 130 which is mounted behind a panel (not shown). The panel and, if necessary, the associated substrate are constructed and operate as discussed above in regard to the fiber optic connectors. Thus, when the electrical connector 120 which is associated with the electrical cable 122 is plugged into the host device, the antenna or coil associated with the host device will receive information from the transponder 70 mounted to the electrical connector 120. The transponder 70 can be attached to the electrical connector 120 by way of an adhesive material, a clip, or the transponder 70 can be insert molded into the body of the electrical connector 120. The transponder 70 can be attached to electrical connectors out in the field.

Figure 14:
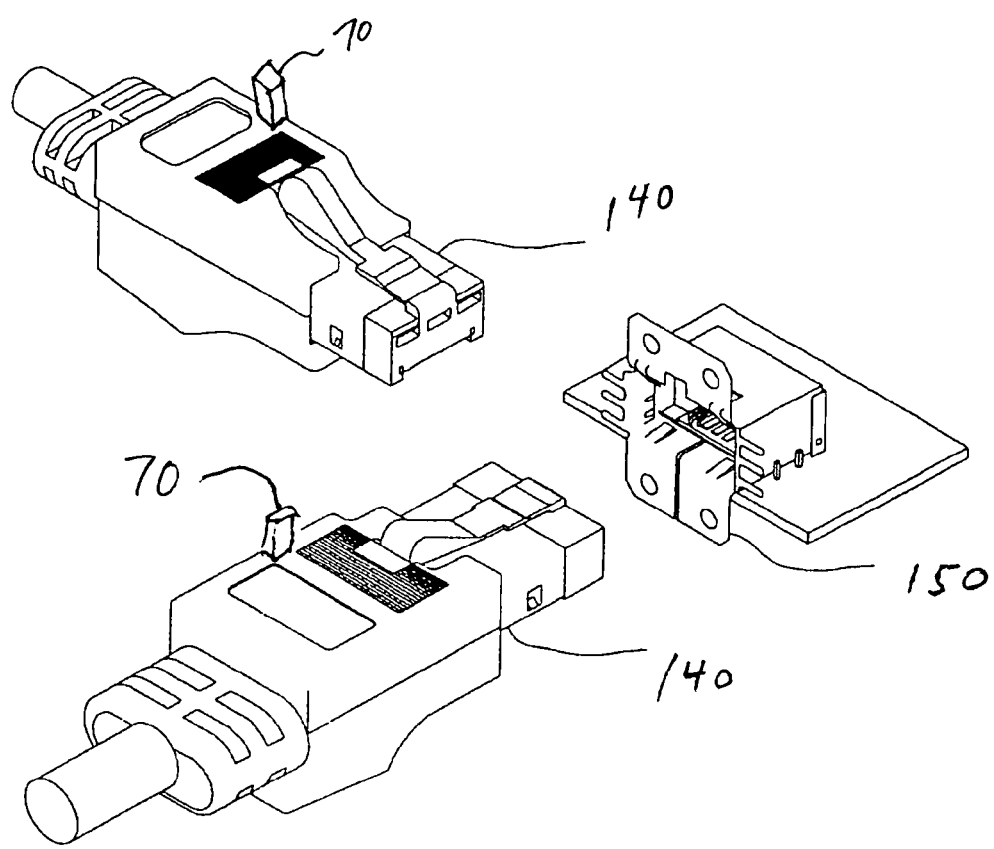
FIG. 14 is a perspective view of the combination of the electrically conductive, copper based cable of FIG. 2 and the transponder.

FIG. 14 is a perspective view of another version of the electric connector shown in FIG. 13. FIG. 14 provides two perspective views of electric connector 140 to which is attached transponder 70. Also shown is receptacle 150 which accepts electrical connector 140. Again, the panel of the host device is not shown for reasons of clarity. Note that the disclosed electrical connectors 120, 140 are used for illustration purposes only. The embodiment of the invention encompasses the attachment or mounting of a transponder to any type or style of electrical connector.

The transponder can also be attached to an optoelectronic device. FIG. 15 is a perspective view of an optoelectronic device 160 to which is attached a transponder 70. The optoelectronic device 160 includes a fiber optic connector 170 and an electrical connector 180. In use, the optoelectronic device 160 has its electrical connector 180 attached to host device through a panel of the host device similar to the attachment of the optical fibers to the host device as discussed above in the explanation of the first embodiment of the invention. Thus, the antenna associated with the panel activates the transponder 70 of the optoelectronic device 160. The tranponder 70 can be attached to optoelectronic devices 160 which are in use, or the transponder 70 can be insert molded or mounted within the housing of the optoelectronic device 160. Note that the disclosed optoelectronic device 160 is used for illustration purposes only. The embodiment of the invention encompasses the attachment or mounting of a transponder to any type or style of optoelectronic device.

One embodiment of the invention is disclosed in FIG. 16. FIG. 16 is a perspective view of a connector 200 plugged into a host device 300.

FIG. 17 is an enlarged perspective view of the connection between the connector 200 and an optical test unit 300. Attached to the connector 200 is a transponder 70. Attached to the host device 300 is an antenna 320, thus the connector 200 is attached to an optical fiber. The connector 200 is an optical connector. The antenna 320 is shown as giving a generally circular shape, however any suitable shape may be used. For reasons of clarity, FIG. 17 does not show the antenna 320 attached to a transceiver so as to form a reader, however one is attached to the antenna 320 of the optical test unit 300. The disclosures of the components displayed in FIGS. 1–15 are incorporated in the present embodiment.

In practice, the connector 200 and the optical test unit 300 are used as a testing system, apparatus, or device. The connector 200 is the component to be tested and the optical test unit 300 evaluates the component. Typical of some of the parameters that the optical test unit 300 measures of the component under test are the component's back reflection, insertion loss, and attenuation. The data measured by the optical test unit 300 is stored and is then selectively conveyed to the transceiver and antenna 320 for downloading to the transponder 70 of the connector 200 (the device under test). Thus the individually measured data concerning the connector 200 is stored on the connector 200 for later use. The connector specific information could be downloaded to the transponder by other means, such as manual entry, however manual entry of data is prone to errors.

Once the performance data of the connector 200 and associated optical fiber has been downloaded on the transponder 70 of the connector 200, the connector 200 can be placed in inventory. In practice, when the connector 200 is taken out of inventory and is placed into use, the connector 200 will be attached to a host device similar, if not the same as, the host device 110 disclosed and described in FIGS. 8–11. The performance data of the connector 200 is transferred to the host device in the same way that data is transferred from the connector 10 to the host device 110 as shown in FIG. 11. Thus, the host device 110 will know the performance data of the connector 200 and such data will enable to the host device 110 to determine if the selected connector 200 is appropriate for the optical power levels and distances involved in the specific application.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
an optical connector;
a transponder attached to said optical connector;
an optical test unit including;
   an antenna attached to the optical test unit; and
   a transceiver electrically connected to the antenna so as to form a reader / writer which is capable of activating and imparting information to the transponder from the optical test unit
wherein said optical connector is attachable to said optical test unit and said optical test unit is configured to, during attachment,
   perform at least one diagnostic test to measure at least one optical property of said optical connector or an optical device connected through said connector;
   store measured optical performance information; and
   impart at least a portion of said optical performance information onto said transponder.

2. A device according to claim 1 wherein the connector is a fiber optic connector.

3. A device according to claim 2 wherein the information imparted to the transponder includes insertion loss data of the fiber optic connector.

4. A device according to claim 2 wherein the information imparted to the transponder includes attenuation loss data of an optical fiber associated with the fiber optic connector.

5. A device according to claim 2 wherein the information imparted to the transponder includes back reflection data associated with the fiber optic connector.

* * * * *